Sept. 17, 1935.  K. LUTOMIRSKI  2,014,534
ALTERNATING CURRENT GENERATOR
Filed Aug. 16, 1934
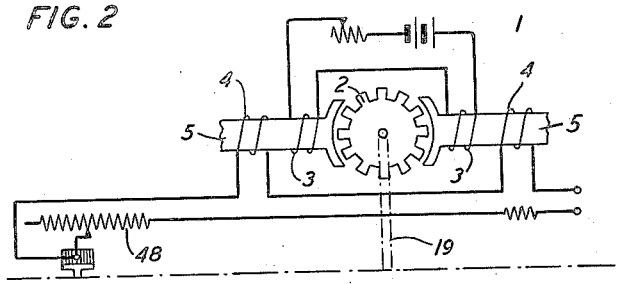
FIG. 2
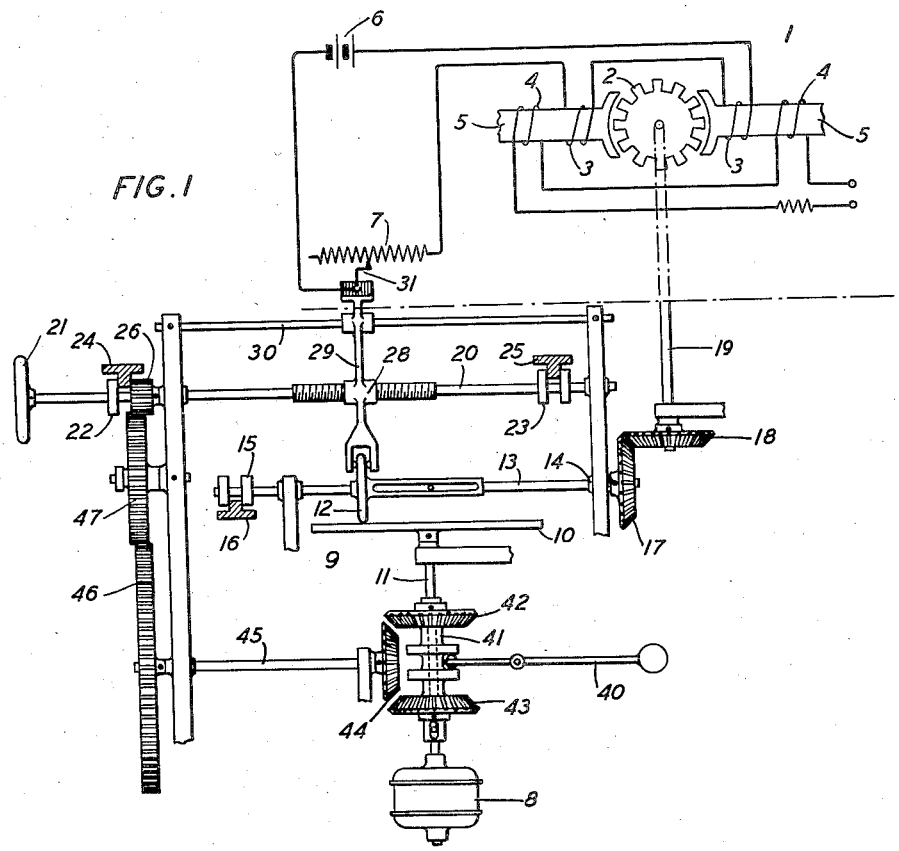
FIG. 1
FIG. 3
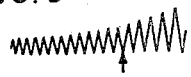
INVENTOR
K. LUTOMIRSKI
BY Wayne B Wells.
ATTORNEY Patented Sept. 17, 1935

2,014,534

UNITED STATES PATENT OFFICE 2,014,534

ALTERNATING CURRENT GENERATOR

Karel Lutomirski, New York, N. Y., assignor to Bell Telephone Laboratories, Incorporated, New York, N. Y., a corporation of New York Application August 16, 1934, Serial No. 740,058

7 Claims. (Cl. 171—231)

This invention relates to alternating current generators and particularly to alternating current generators that may be operated at variable speed.

One object of the invention is to provide an alternating current generator that shall be operated at different speeds while maintaining the output voltage thereof substantially constant in an improved manner.

Another object of the invention is to provide an alternating current generator that shall be operated at variable speed while simultaneously varying the generator excitation to maintain the output voltage substantially constant.

A further object of the invention is to provide an alternating current generator having propelling means that shall not only control the generator to vary frequency of the current generated but that shall also control the generator to maintain the output voltage substantially constant.

Oscillators are employed in measuring systems for toll offices of a telephone system that will produce variable frequency current at substantially constant voltage. The oscillators now in use are of the space discharge type. These oscillators take up considerable room, are expensive and have somewhat of maintenance expense.

In accordance with the present invention it is proposed to supply the measuring systems with variable frequency constant voltage current by means of a dynamo-electric machine. A dynamo-electric machine for this work would be relatively inexpensive, would have small maintenance cost and would not occupy much room.

The alternating current generator employed to supply constant voltage variable frequency current is preferably of the inductor type having a toothed rotor and stationary armature and field windings. The toothed rotor is operated by a motor which is preferably a synchronous motor that may be started as an induction motor. Between the propelling motor and the generator, gearing is provided for varying the speed of the generator and accordingly the frequency of the generated current. Preferably friction gearing is provided between the propelling motor and the generator. A friction disc, which is rotated by the motor, engages a friction wheel attached in any suitable manner to the rotor of the generator. Preferably the friction wheel is radially moved on the surface of the friction disc to vary the speed of the generator.

The field excitation of the generator or the output voltage of the generator is varied according to the speed of the generator in order to maintain the generator voltage substantially constant irrespective of the generator speed or generator frequency. The mechanism which is provided for moving the friction wheel with respect to the friction disc is preferably provided with means for adjusting a rheostat in the field winding circuit of the motor. If the speed of the motor is reduced the excitation of the generator field windings is increased and if the speed of the motor is increased the field excitation of the generator is decreased. If so desired, means may be provided for adjusting the position of the friction wheel with respect to the friction disc by power supplied by the motor which drives the generator.

It is apparent that a rheostat in the output circuit of the generator may be varied according to the movement of the friction wheel with respect to the friction disc to maintain the output voltage of the generator substantially constant. Moreover, other means aside from the variation of the rheostat in the generator field winding circuit may be provided for varying the flux produced by the generator field winding according to the variation of the friction wheel with respect to the friction disc.

In the accompanying drawing,

Fig. 1 is a diagrammatic view of an alternating current generator controlled according to the invention;

Fig. 2 is a modification of the invention showing the controlling of the generator output circuit in place of controlling the field current by the generator control means; and Fig. 3 is a diagrammatic view of a tapered resistance element which may be employed to control either the generated voltage or the generator field current.

Referring to Fig. 1 of the drawing a generator 1 of the inductor type is shown comprising a toothed rotor 2, a field winding 3 and an armature winding 4. The field winding 3 and the armature winding 4 are mounted upon suitable pole pieces 5. The field winding is energized from a suitable source 6, and a resistance element or rheostat 7 is provided in the field winding circuit which may be controlled in a manner to be hereinafter set forth.

A motor 8 of any suitable type is provided for operating the generator 1 through suitable friction gearing 9. The motor 8 is preferably a synchronous motor which may be started as an induction motor. The friction gearing 9 comprises a friction disc 10 which is fixedly secured to the shaft 11 of the motor 8. A friction gear wheel 12 is keyed to and slidably mounted on a shaft 13. The friction wheel 12 engages the surface of the friction disc 10 and may be moved radially with respect to the surface of the friction disc. The shaft 13 which carries the friction wheel 12 is rotatably mounted in a bearing 14 near one end thereof and near the other end thereof is supported by grooved collar 15 which is mounted on a rail member 16. The grooved collar 15 serves to prevent any longitudinal movement of the shaft 13 while permitting free rotation of the shaft. A beveled gear wheel 17 secured to the end of the shaft 13 meshes with a similar beveled gear wheel 18 which is fixedly secured to a shaft 19 for the rotor 2 of the generator 1.

A threaded shaft 20 having an operating handle 21 at the end thereof is provided for moving the friction wheel 12 radially on the friction disc 10 to vary the speed of the generator 1 and accordingly the frequency of the generated current. Two grooved collars 22 and 23 are provided for preventing longitudinal movement of the threaded shaft 20. The grooved collars are fixedly mounted on the shaft 20 and rotate therewith. The groove in the collar 22 is engaged by a rail 24 and the groove in the collar 23 is engaged by a rail 25. Gear teeth 26 are provided on the collar 22 for a purpose to be hereinafter set forth. A nut 28 on the threaded shaft 20 is carried by an arm 29. One end of the arm 29 is bifurcated and engages the friction wheel 12 so that the friction wheel 12 follows the movement of the nut 28 on the threaded shaft 20. The opposite end of the arm 29 is mounted on a rod 30 and carries a contact member 31 engaging the resistance element 7. The contact member 31 is moved according to the movement of the nut 28 and the friction wheel 12 to vary the current flow through the field winding 3 of the generator 1.

Assuming the motor 8 is in operation the generator 1 will be operated at a speed according to the position of the friction wheel 12 on the friction disc 10. If it is desired to change the frequency of the current generated by the generator 1, the wheel 21 is operated to vary the position of the friction wheel on the friction disc and thus vary the speed of the generator. The setting of the rheostat 7 is varied according to the change in position of the friction wheel on the friction disc so that the voltage of the generator is maintained substantially constant.

A hand lever 40 is provided for rotating the threaded shaft 20 by the motor 8 in a forward or a reverse direction to control the speed of the generator 1. The hand lever 40 is pivotally mounted in any suitable manner and engages a bushing 41 which is slidably mounted upon the shaft 11 but keyed thereto. The bushing 41 carries two beveled gear wheels 42 and 43 which may be moved into engagement with the beveled gear wheel 44 on a shaft 45. The shaft 45 is provided with suitable bearing and carries a gear wheel 46 which is connected to the teeth 26 on the collar 22 by means of a gear wheel 47. When the handle 40 is operated to effect engagement between the beveled gear wheels 43 and 44, the threaded shaft 20 is rotated in one direction and when the beveled gear wheels 42 and 44 are moved into engagement with each other by the lever 40, threaded shaft 20 is rotated in an opposite direction.

In Fig. 2 of the drawing the motor 1 shown in Fig. 1 is illustrated with an adjustable resistance or rheostat 48 in the leads of the generator. The generator shown in Fig. 2 is similar to the generator shown in Fig. 1 and is operated in a like manner. Accordingly, the means for operating the generator are not shown in Fig. 2 and like parts have been indicated by similar reference characters. The rheostat 48 in the leads of the generator 1 is operated in the same manner as the rheostat 7 shown in Fig. 1 of the drawing.

If non-linear gear wheels are provided for coupling the motor of the generator, such as cone-shaped discs or similar devices, it may be necessary to taper the resistance element 7 as, for example, in the manner shown in Fig. 3 of the drawing. When the generator voltage is controlled by a rheostat in the field circuit it is preferable to have the resistance of the field winding small compared with the external resistance or rheostat.

Modifications in the generator structure and in the arrangement and location of parts may be made within the spirit and scope of the invention and such modifications are intended to be covered by the appended claims.

What is claimed is:

1. A mechanical oscillation system comprising a motor, an alternating current generator, means comprising a rheostat in the generator field circuit for controlling the generator voltage, a variable speed transmission between said motor and said generator, and means for simultaneously controlling said transmission and said rheostat to vary the speed of said generator and the resistance in the field of said generator so that a substantially constant voltage output can be obtained regardless of the frequency of said output.

2. A mechanical oscillation system comprising a motor, a generator having armature and field windings, control means for varying the generator field current, a variable speed transmission between said motor and said generator, said transmission comprising a friction disc, and a friction wheel driven by said friction disc, and means for moving said friction wheel toward and away from the axis of said friction disc to change the speed of said generator and for simultaneously governing said control means to vary the field strength of said generator so that a substantially constant voltage output can be obtained regardless of the frequency of said output.

3. In combination, a substantially constant speed motor, an alternating current generator, mechanism for operating the generator by said motor, and means for varying said mechanism to change the generator speed with respect to the motor speed and change the frequency of the current produced by said generator and for simultaneously varying the generator field excitation to maintain the generator at the same constant voltage irrespective of changes in the generator speed.

4. In combination, a synchronous motor, an alternating current generator, a rheostat for controlling the field excitation of said generator, changeable gearing for connecting the generator to said motor and means for simultaneously operating said rheostat and varying said gearing to vary the generator frequency while maintaining the generator voltage constant.

5. In combination, a synchronous motor, an alternating current generator, a rheostat for controlling the field excitation of said generator, adjustable gear mechanism for operating the generator at different speeds by said motor, control means for governing said gear mechanism to operate the generator at any desired speed, and means connected to and operated by said control means for operating said rheostat according to the operation of said control means to maintain the generated voltage constant irrespective of the change in generator speed.

6. In combination, a constant speed motor, an alternating current generator, a rheostat for controlling the field excitation of said generator, adjustable gear mechanism for operating the generator at different speeds by said motor, control means for governing said gear mechanism to operate the generator at any desired speed, means for operating the control means by said motor, and means connected to and operated by said control means for operating said rheostat according to the operation of said control means to maintain the generated voltage constant irrespective of the change in generator speed.

7. In combination, a constant speed motor, an alternating current generator, a rheostat for controlling the voltage of said generator, adjustable gear mechanism comprising a friction disc and friction wheel driven by said friction wheel for operating the generator at different speeds by said motor, control means for varying the position of the friction wheel with respect to the friction disc to operate the generator at any desired speed, means for operating the control means by said motor, and means connected to and operated by said control means for operating said rheostat according to the operation of said control means to maintain the generated voltage constant irrespective of the change in generator speed.

KAREL LUTOMIRSKI.